(12) United States Patent
Dryer et al.

(10) Patent No.: US 11,055,528 B2
(45) Date of Patent: Jul. 6, 2021

(54) REAL-TIME IMAGE CAPTURE CORRECTION DEVICE

(71) Applicant: BANK OF AMERICA CORPORATION, Charlotte, NC (US)

(72) Inventors: Eric Dryer, Charlotte, NC (US); Brendan Patrick Spencer Murphy, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 147 days.

(21) Appl. No.: 16/433,274

(22) Filed: Jun. 6, 2019

(65) Prior Publication Data
US 2020/0387703 A1 Dec. 10, 2020

(51) Int. Cl.
*G06K 9/00* (2006.01)
*G06K 9/03* (2006.01)
*G06K 9/18* (2006.01)
*G06K 9/20* (2006.01)

(52) U.S. Cl.
CPC ..... *G06K 9/00483* (2013.01); *G06K 9/00449* (2013.01); *G06K 9/00463* (2013.01); *G06K 9/00469* (2013.01)

(58) Field of Classification Search
CPC ........... G06K 9/00449; G06K 9/00463; G06K 9/00469; G06K 9/00483
See application file for complete search history.

(56) References Cited

U.S. PATENT DOCUMENTS

| | | | |
|---|---|---|---|
| 5,444,794 A | 8/1995 | Uhland, Sr. | |
| 7,181,430 B1 | 2/2007 | Buchanan et al. | |
| 8,688,579 B1* | 4/2014 | Ethington | G06K 9/4609 705/42 |
| 8,824,772 B2 | 9/2014 | Viera et al. | |
| 2008/0253659 A1* | 10/2008 | Walch | G06K 9/46 382/186 |
| 2009/0226072 A1 | 9/2009 | Rossignoli et al. | |
| 2012/0030104 A1* | 2/2012 | Huff | G06Q 30/06 705/42 |
| 2014/0270536 A1* | 9/2014 | Amtrup | G06K 9/00483 382/195 |

* cited by examiner

*Primary Examiner* — Soo Shin
(74) *Attorney, Agent, or Firm* — Michael A. Springs; Moore & Van Allen PLLC; Nicholas C. Russell

(57) ABSTRACT

Embodiments of the invention include systems, methods, and computer-program products for providing an internal digital encoding as an overlay of a data element on a resource distribution instrument for blank space correction. The invention identifies a type of resource distribution instrument with blank space or faded spaces and queue it for encoding. In this way, the encoding may be a layer for a user to view the data element to confirm the resource associated with the resource distribution instrument. The encoding may be embedded into the resource distribution instrument and removable upon external transmission.

20 Claims, 9 Drawing Sheets

REAL-TIME IMAGE CAPTURE CORRECTION DEVICE

BACKGROUND

Entities typically receive large volumes of documents from vendors, customers, or employees on any given day. Each document is typically reconciled. In this way, specific characteristics of a document are matched and correlated. However, sometimes no match can be made, especially when utilizing new assisted client transaction technology and/or due to poor ribbon quality by issuing entities. As such, a system may be necessary to examine other characteristics of the document for processing.

BRIEF SUMMARY

Embodiments of the present invention address the above needs and/or achieve other advantages by providing apparatuses (e.g., a system, computer program product and/or other devices) and methods for real-time image capture correction.

In some embodiments, the system may receive images of resource distribution instruments or negotiable instruments from one or more sources. The negotiable instruments may be received from within an entity, from other financial institutions, or the like. In some embodiments, the documents include images of resource distribution instruments, money grams, certified resource distribution instruments, or other financial documents captured by an account holder or other entity. From the received negotiable instruments, the system may detect data from the financial record image based on one or more indicia on the negotiable instrument. This information may from an indicia and be any written or printed information on the front or back of the negotiable instrument. The negotiable instruments may include a myriad of financial documents, including but not limited to resource distribution instruments, lease documents, mortgage documents, deposit slips, payment coupons, receipts, general ledger tickets, or the like.

Current technology allows for users to deposit negotiable instruments, such as resource distribution instruments via mobile deposit technology by scanning via a user device or entity device. However, some resource distribution instruments, such as certified resource distribution instruments or the like are not able to be processed via current mobile deposit technology. Furthermore, some resource distributions instruments, such as the ones with the resource information pre-printed on the physical instrument, such as money grams or the like, are not imaged properly via mobile deposit technology based on ink contrast or the like. As such, the resource amount, upon binomial conversion disappear and become blank space to the network. The bi-tonal converted resource distribution instrument is then utilized across entities for resource exchange. Currently, the entity cannot re-write the blank space as that is considered mutilation of the resource distribution instrument.

The invention provides a digital encoding or virtual overlay of a data element on a resource distribution instrument. The system may identify the type of resource distribution instrument and queue it for encoding based on the type of resource distribution instrument. In this way, the encoding may be a layer for a user to view the data element to confirm the resource amount associated with the resource distribution instrument. The encoding may be embedded into the MICR line or generate a virtual overlay. This encoding will be placed on the resource distribution instrument image before transmitted to an external entity. The encoding will be virtually placed on the image as an overlay for internal processing and will not be visible on the actual resource distribution instrument image when transmitted externally.

Embodiments of the invention relate to systems, methods, and computer program products for real-time image capture correction, the invention comprising: receiving an electronic image associated with a resource distribution instrument; performing bi-tonal transformation to generate a resource distribution instrument image for internal and external processing of the resource distribution instrument; identifying unresolved indicia associated with the generated resource distribution instrument image, wherein the unresolved indicia includes a missing or faded data element; queuing the resource distribution instrument image for encoding based on identification of unresolved indicia including blank space; encoding the resource distribution instrument image via overlay with an encoded version of a data element; continuing internal processing of the a resource distribution instrument using the resource distribution instrument image, wherein continuing internal processing allows internal users access to the encoded version of the data element for identification of the blank space; and removing the encoded data element from the resource distribution instrument image upon external transmission.

In some embodiments, identifying unresolved indicia associated with the generated resource distribution instrument image further comprises processing the resource distribution instrument image via an artificial intelligence processor to identify if the resource distribution instrument image matches a historic resource distribution instrument type that has blank space with a missing or faded data element.

In some embodiments, identifying unresolved indicia associated with the generated resource distribution instrument image further comprises manual identification of blank space within the resource distribution instrument image that includes a missing of faded data element.

In some embodiments, the unresolved indicia associated with the generated resource distribution image further comprises blank space created by the bi-tonal transformation comprising one or more missing or faded data elements at the location of the created blank space. In some embodiments, the unresolved indicia is unidentifiable data of a value of resources associated with the resource distribution instrument.

In some embodiments, receiving the electronic image associated with the resource distribution element further comprises receiving data representing one or more resolved indicia that has been discerned with a selected level of confidence from the electronic image, wherein the one or more resolved indicia is at least one of: 1) data related to a payor, 2) date related to a payor account, or 3) dated related to a payee and an indicator indicating one or more unresolved blank spaces in the electronic image associated with the electronic image that has not been resolved to a level of confidence.

In some embodiments, encoding the resource distribution instrument image via overlay with an encoded version of a data element further comprises digitally or virtually encoding on the MICR line of the resource distribution instrument image an amount of resource distribution associated with the resource distribution instrument, wherein a location of the amount on the resource distribution instrument image is blank space due to bi-tonal processing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
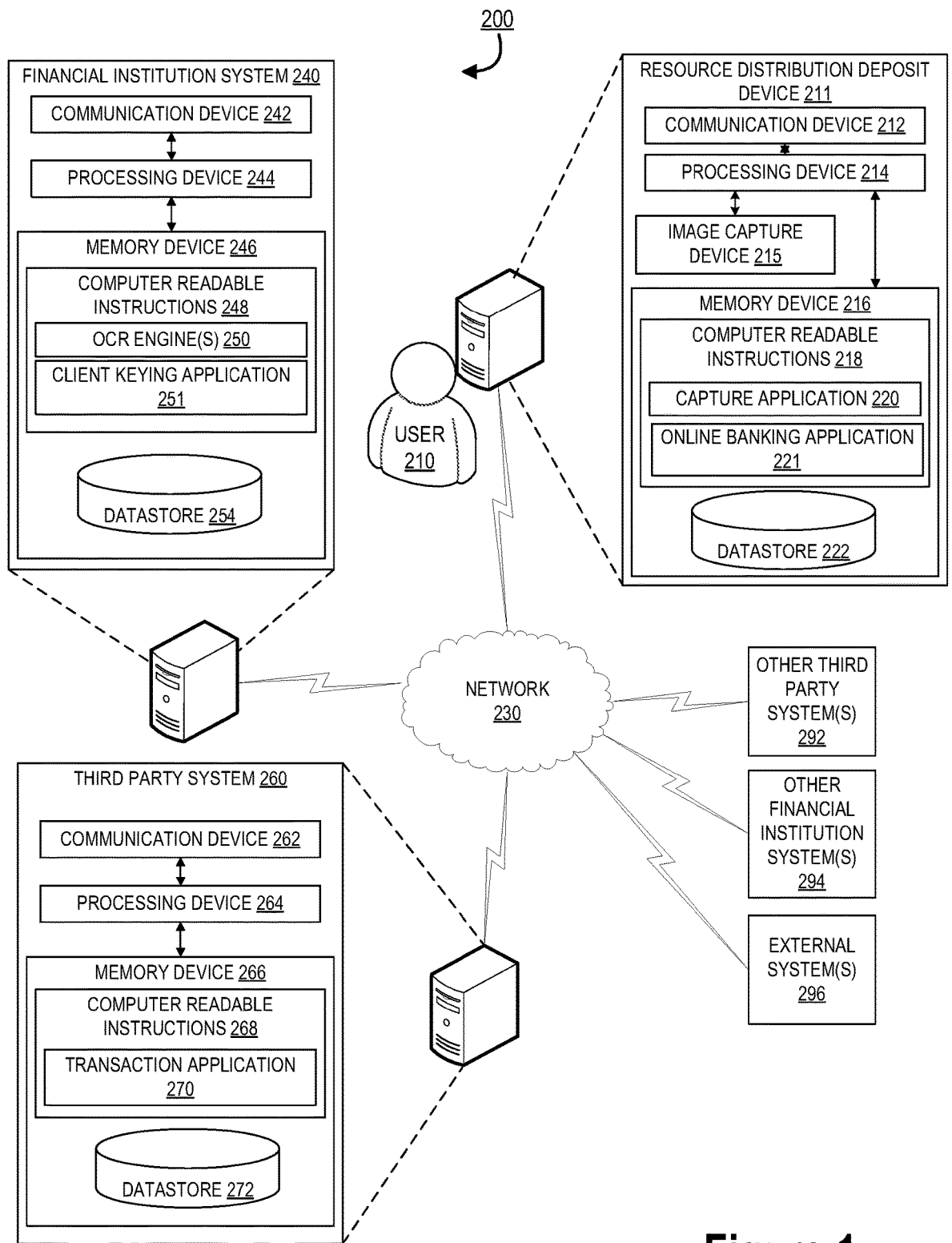
Figure 2:
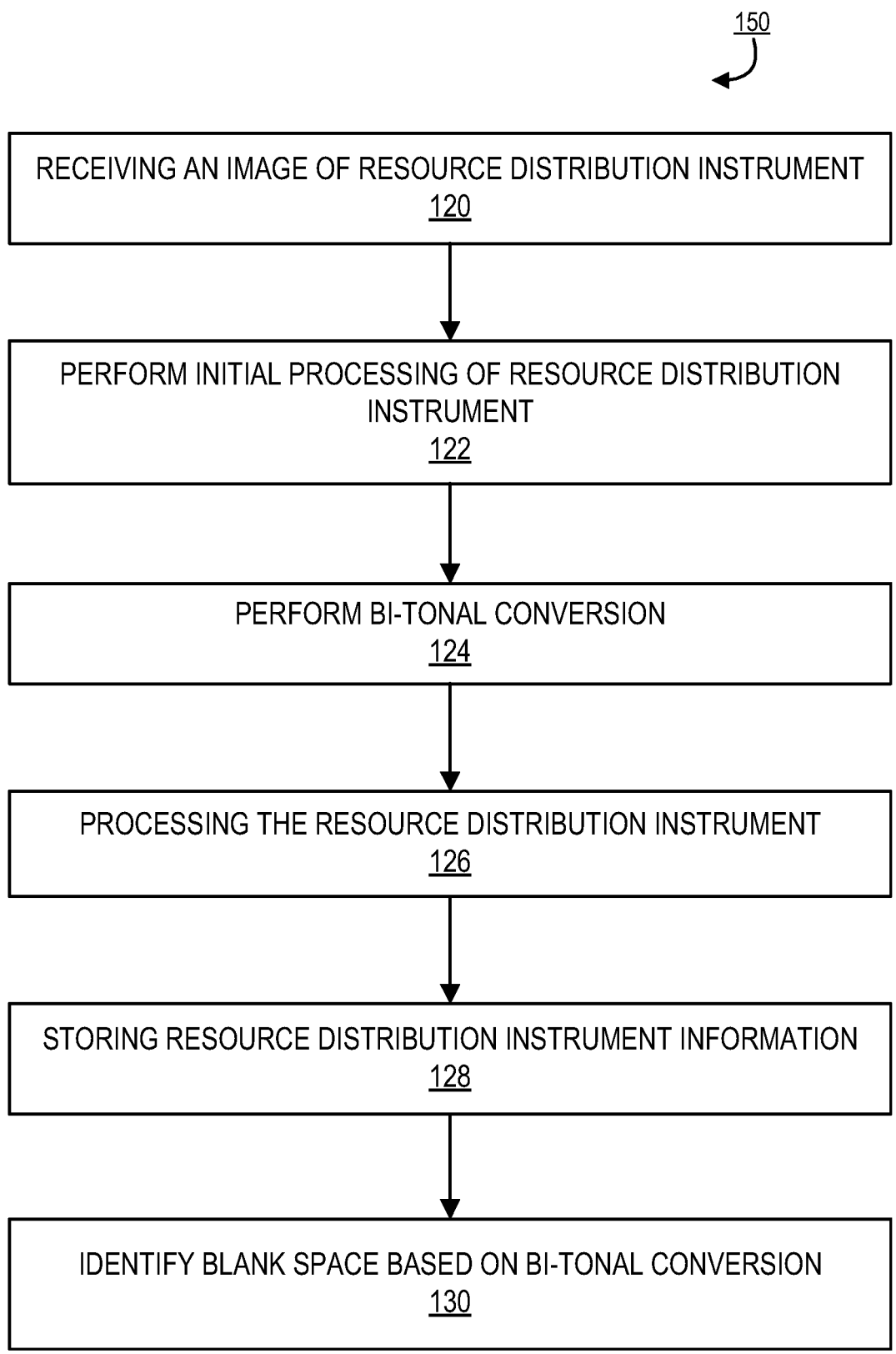
Figure 3:
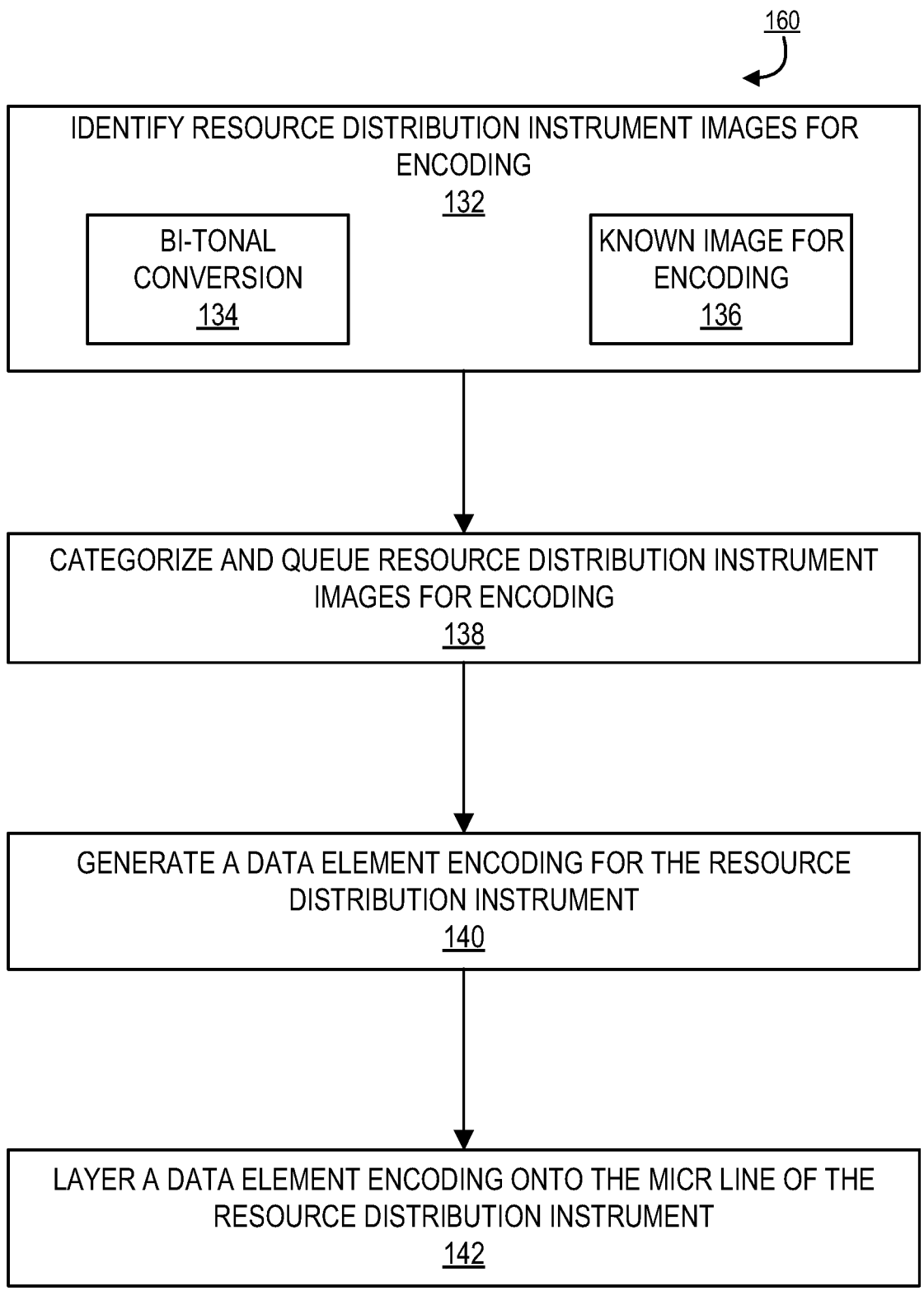
Figure 4:
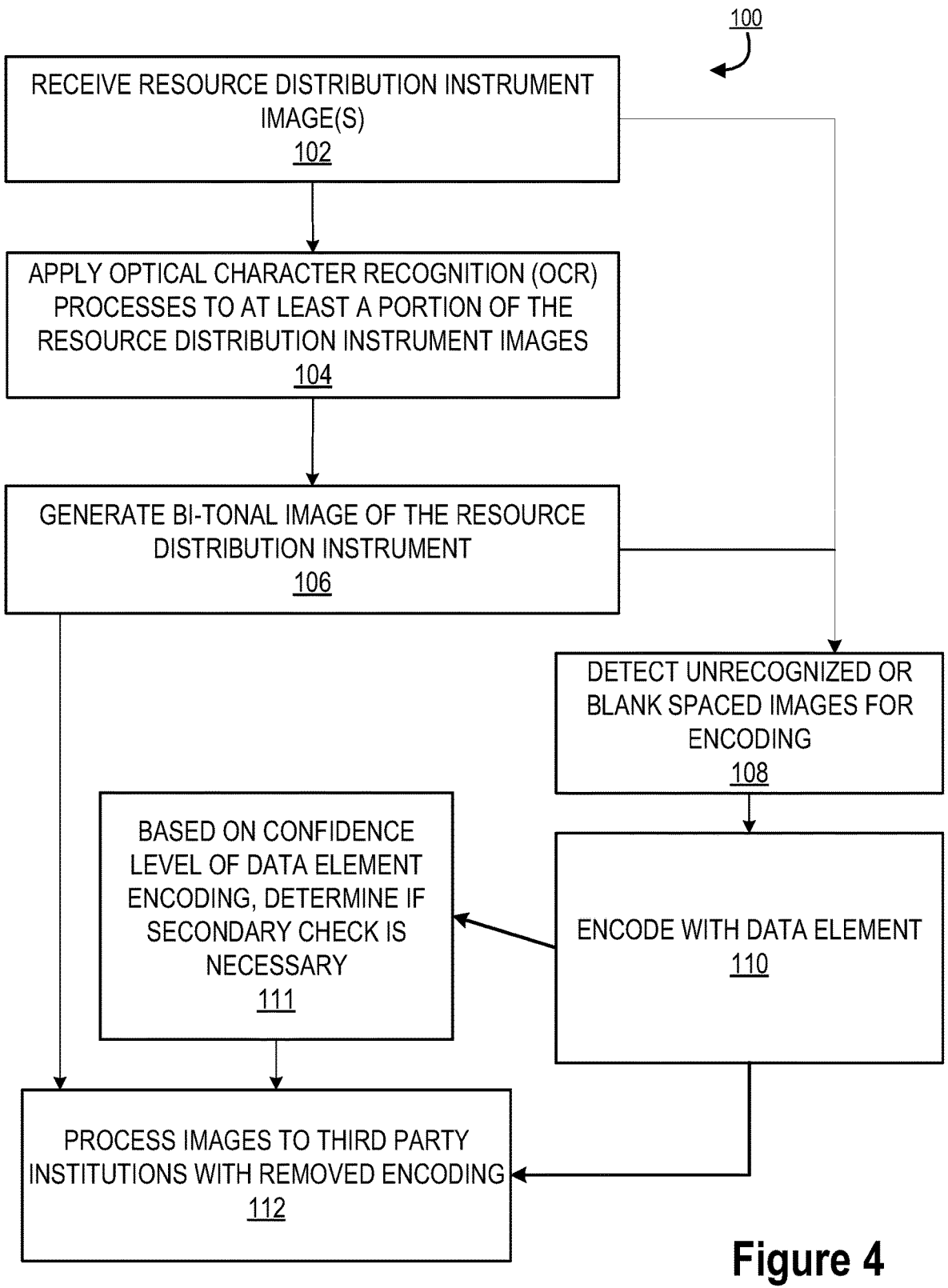
Figure 5A:
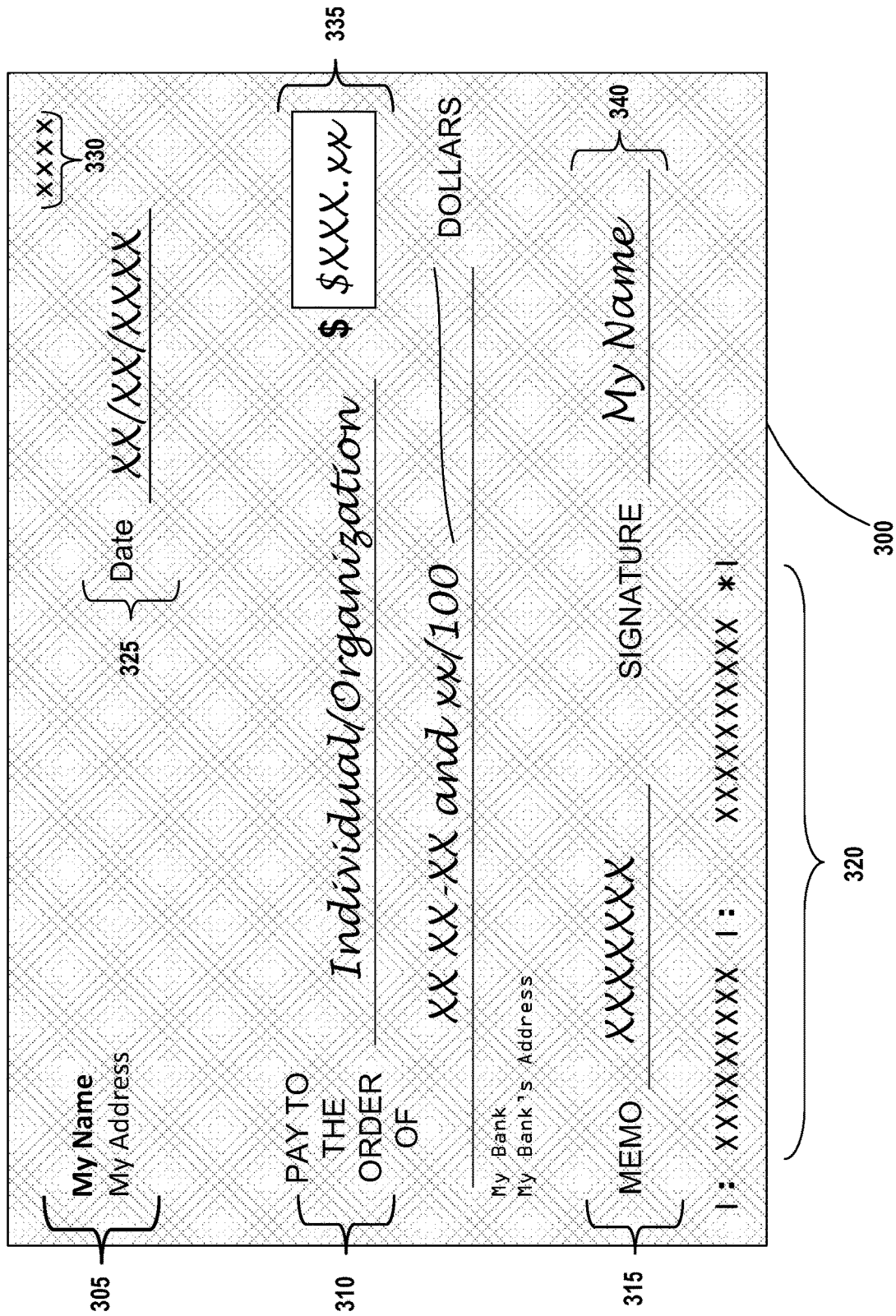
Figure 5B:
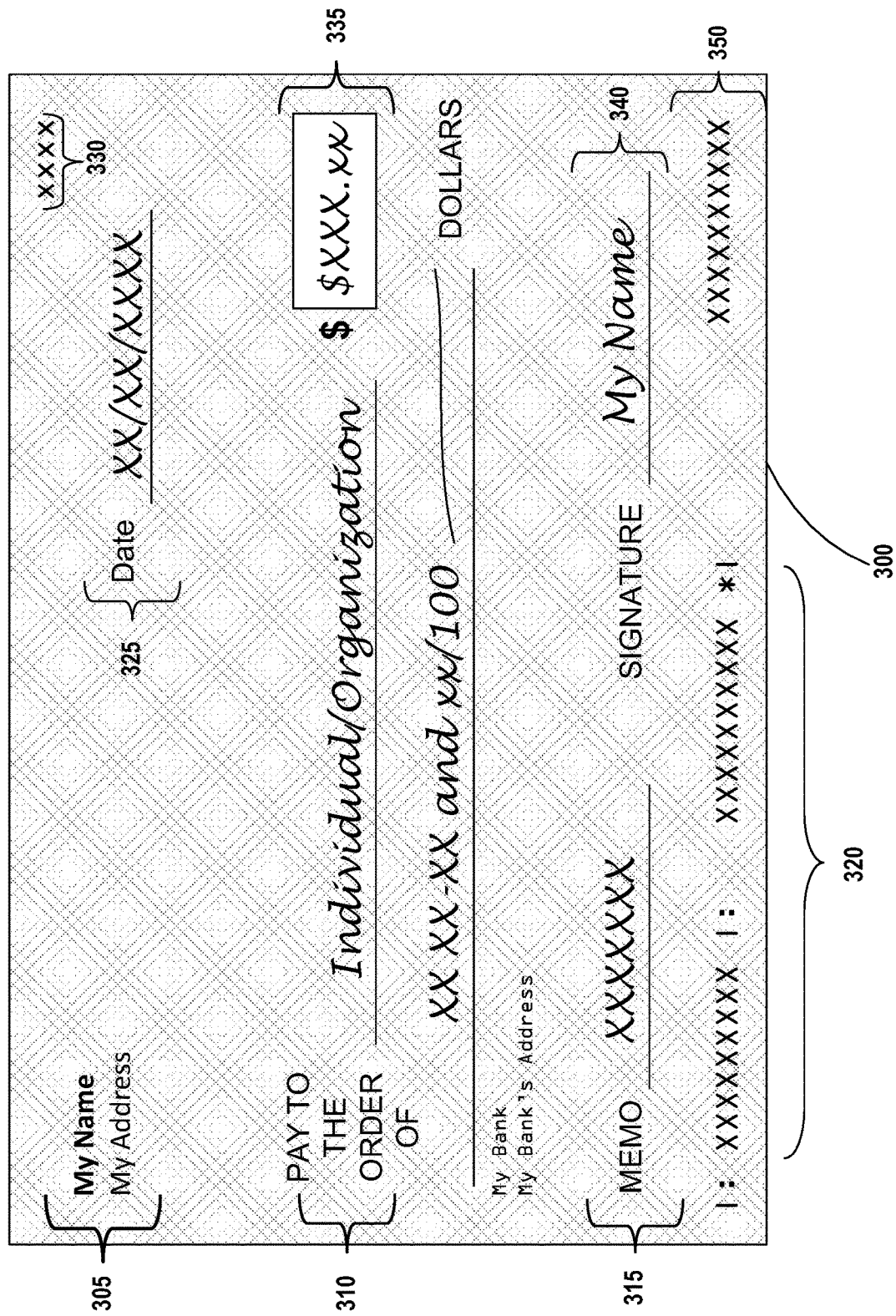
Figure 6A:
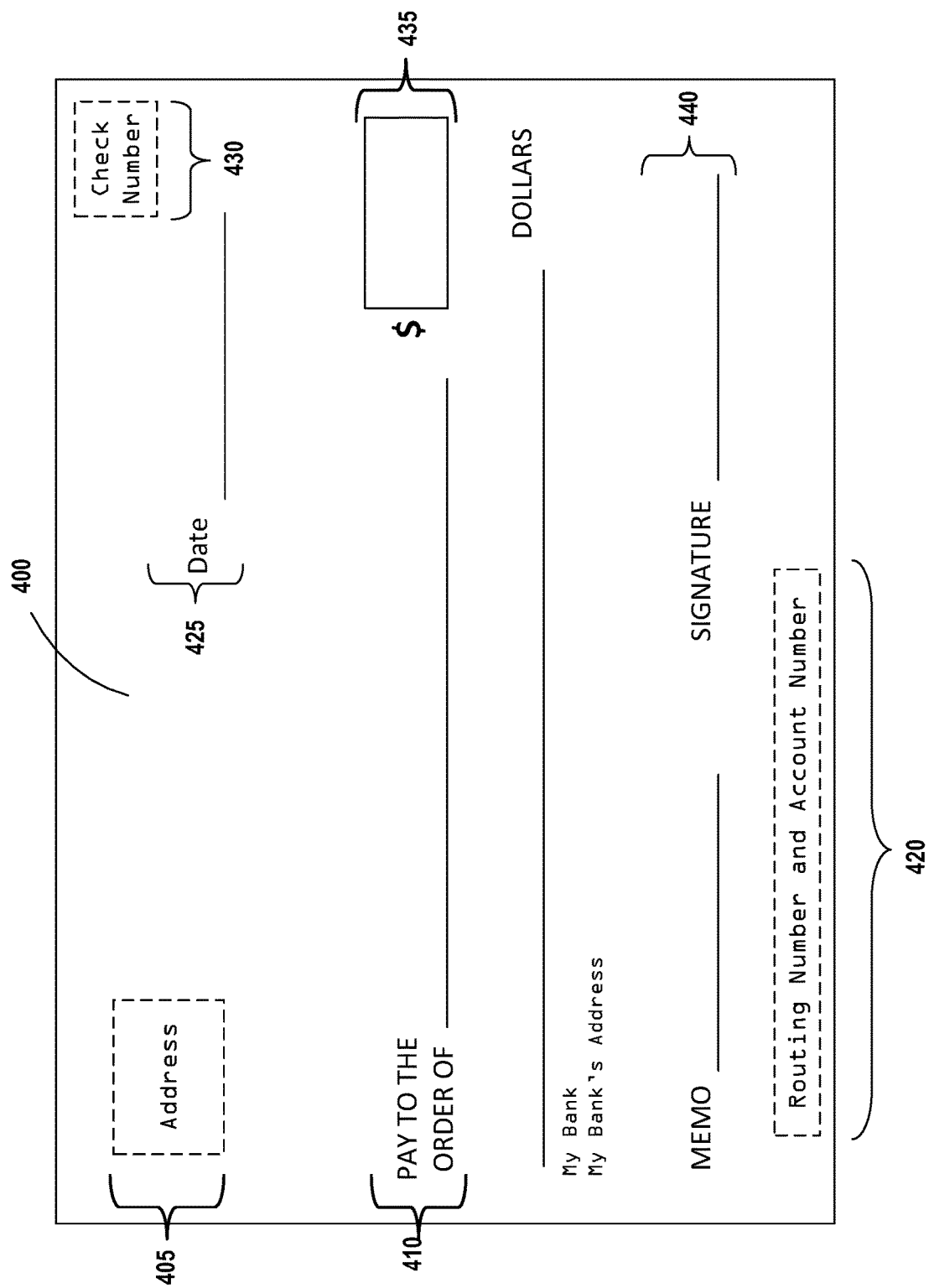
Figure 6B:
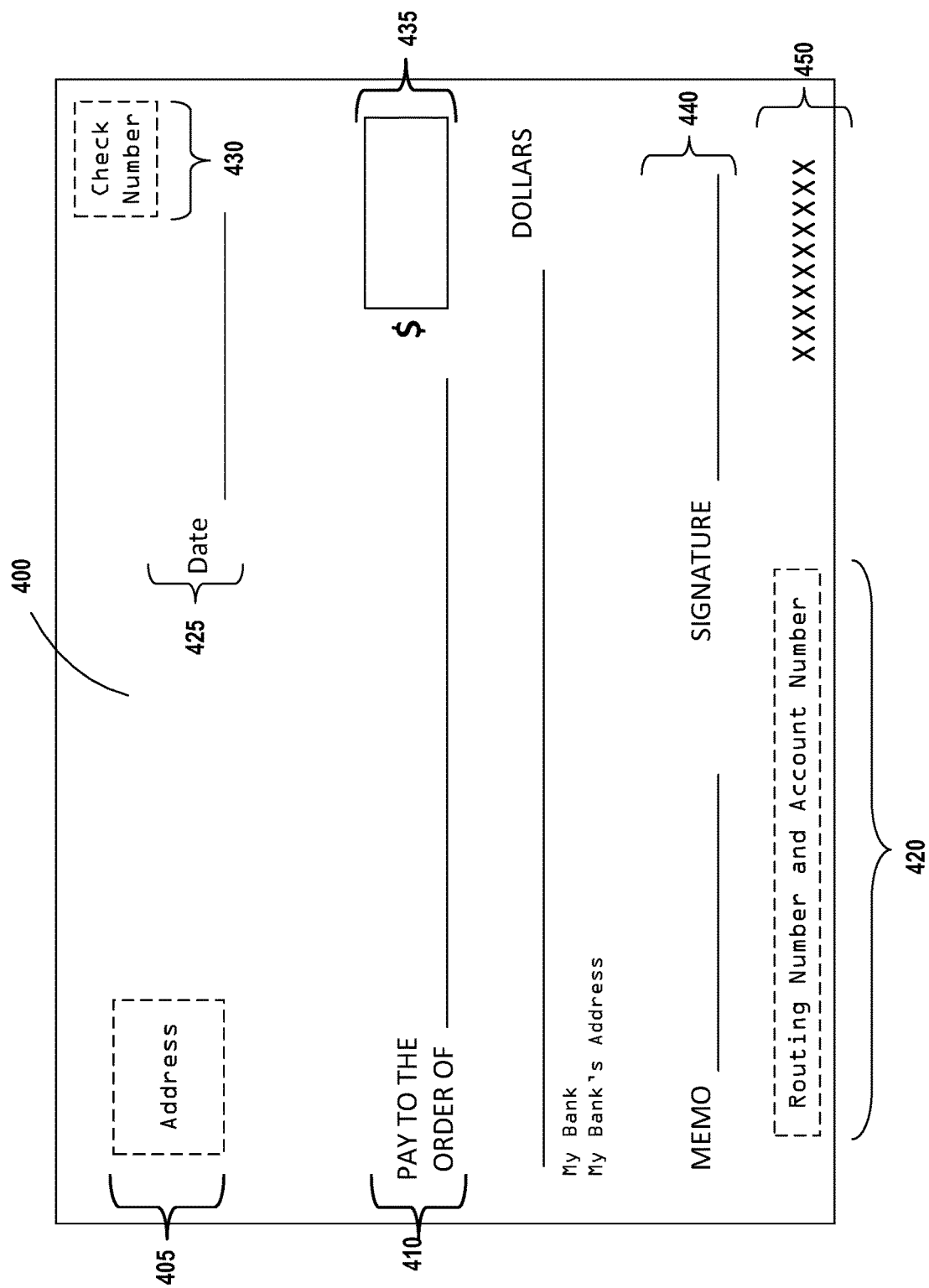
Figure 7:
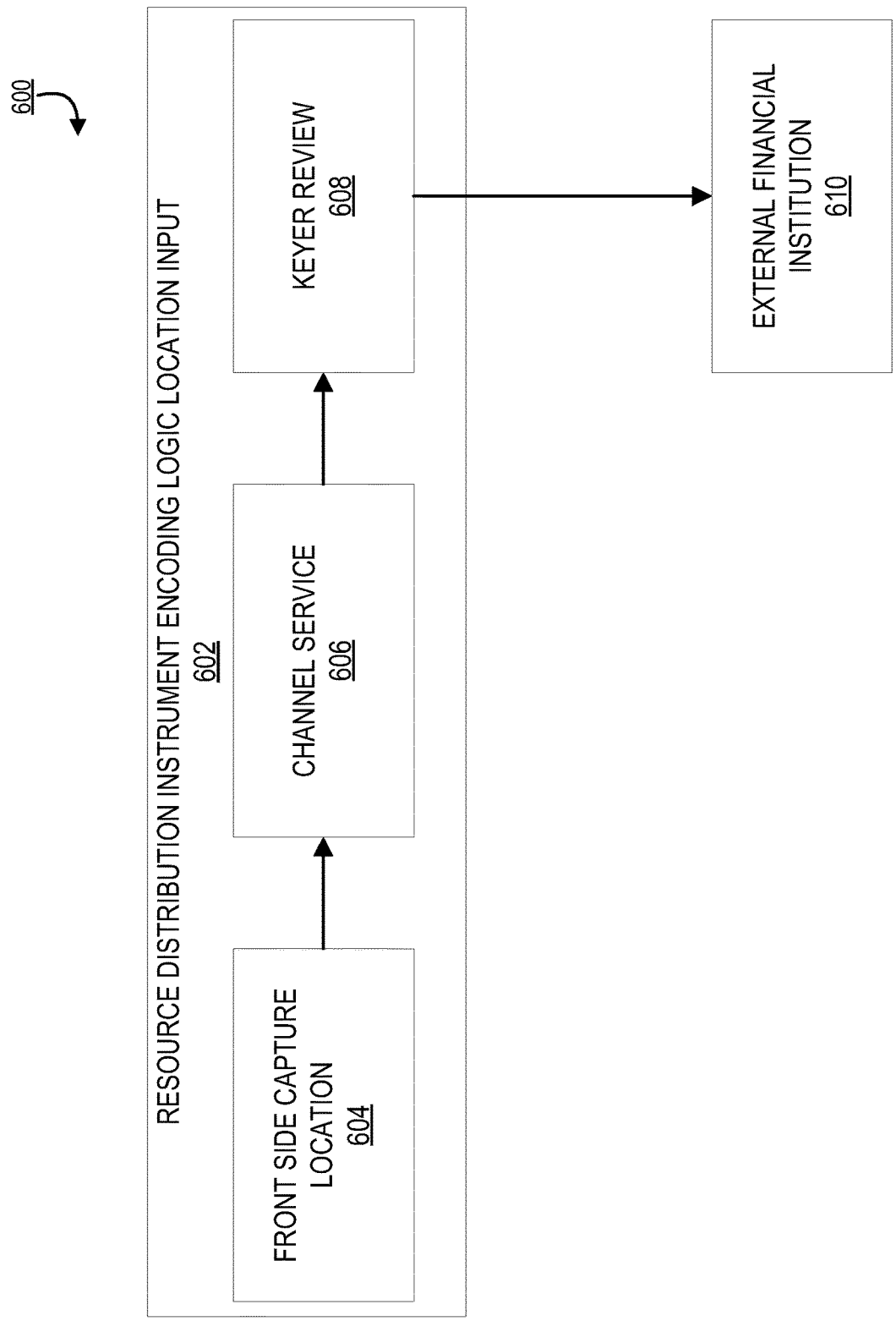

Having thus described embodiments of the invention in general terms, reference will now be made to the accompanying drawings, wherein:

FIG. 1 provides an image capture correction system environment, in accordance with one embodiment of the present invention;

FIG. 2 provides a high level process flow illustrating image capturing and processing, in accordance with one embodiment of the present invention;

FIG. 3 provides a high level process flow illustrating identifying resource distribution instrument images for encoding, in accordance with one embodiment of the present invention;

FIG. 4 provides a high level process flow illustrating identifying and extracting indicia and data from resource distribution instruments, in accordance with one embodiment of the present invention;

FIG. 5A illustrates an exemplary image of a financial record, in accordance with one embodiment of the present invention;

FIG. 5B illustrates an exemplary image of a financial record that has been encoded, in accordance with one embodiment of the present invention;

FIG. 6A provides an exemplary template of a financial record, in accordance with one embodiment of the present invention;

FIG. 6B provides an exemplary template of a financial record that has been encoded, in accordance with one embodiment of the present invention; and FIG. 7 provides a process flow illustrating resource distribution instrument encoding logic location identification, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document," "negotiable instrument," "financial document," "financial record," or "payment instrument" may also refer to a myriad of negotiable instrument documents, including but not limited to a lease document, a mortgage document, a deposit slip, a payment coupon, a receipt, general ledger tickets, or the like. In some embodiments, "document", "financial record", or "negotiable instrument" may exist as a physical item printed on paper or other medium. In other embodiments, the resource distribution instrument may exist electronically. Furthermore, "document," "financial document," "financial record," "payment instrument," or "negotiable instrument" may also refer to records associated with government data, legal data, identification data, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof. In some embodiments, the "document," "financial record," or "negotiable instrument" may be referred to in examples as a resource distribution instrument or the like. Furthermore, the term "image lift data" or "data lift" may refer to the process of lifting one or more areas/elements of a document and storing those areas as metadata without storing the entire document as an image file.

In some embodiments a resource distribution instrument may be any document for the transfer of resources from one account to another. This may include a certified check, personal check, money gram, or the like. The resource distribution instrument may be a physical instrument or a digital resource distribution instrument.

Current technology allows for users to deposit negotiable instruments, such as resource distribution instruments via mobile deposit technology by scanning via a user device or entity device. However, some resource distribution instruments, such as certified resource distribution instruments or the like are not able to be processed via current mobile deposit technology. Furthermore, some resource distributions instruments, such as the ones with the resource information pre-printed on the physical instrument, such as money grams or the like, are not imaged properly via mobile deposit technology based on ink contrast or the like. As such, the resource amount, upon binomial conversion disappear and become blank space to the network. The bi-tonal converted resource distribution instrument is then utilized across entities for resource exchange. Currently, the entity cannot re-write the blank space as that is considered mutilation of the resource distribution instrument.

The invention provides a digital encoding or virtual overlay of a data element on a resource distribution instrument. The system may identify the type of resource distribution instrument and queue it for encoding based on the type of resource distribution instrument. In this way, the encoding may be a layer for a user to view the data element to confirm the resource amount associated with the resource distribution instrument. The encoding may be embedded into the MICR line or generate a virtual overlay. This encoding will be placed on the resource distribution instrument image before transmitted to an external entity. The encoding will be virtually placed on the image as an overlay for internal processing and will not be visible on the actual resource distribution instrument image when transmitted externally.

FIG. 1 illustrates an image capture correction system environment 200, in accordance with some embodiments of the invention. The environment 200 includes a resource distribution instrument deposit device 211 associated or used with authorization of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The resource distribution instrument deposit device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a resource distribution instrument data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The resource distribution instrument deposit device 211 includes a communication device 212 and an image capture device 215 (e.g., a camera) communicably coupled with a processing device 214, which is also communicably coupled with a memory device 216. The processing device 214 is configured to control the communication device 212 such that the resource distribution instrument deposit device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214. The resource distribution instrument deposit device 211 may be a mobile device of the user 210, a bank teller device, a third party device, an automated teller machine, a video teller machine, or another device capable of capturing a resource distribution instrument image.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated resource distribution instrument stock, or misrepresentative resource distribution instruments that may result in a failure to match the resource distribution instrument to an associated account for processing. As such, the system may identify the exception and code it for exception processing. Furthermore, the system may utilize the metadata to match the resource distribution instrument to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or resource distribution instrument processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate resource distribution instrument processing. Duplicate resource distribution instruments may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the resource distribution instrument deposit device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the resource distribution instrument deposit device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 2, FIG. 2 presents provides a high level process flow illustrating image capturing and processing 150, in accordance with some embodiments of the invention. As illustrated in block 120, the method comprises receiving an image of a resource distribution instrument or other negotiable instrument. The image received may be one or more of a resource distribution instrument, other document, payment instrument, and/or financial record. In some embodiments, the image of the resource distribution instrument may be received by a specialized apparatus associated with the financial institution (e.g. a computer system) via a communicable link to a user's mobile device, a camera, an Automated Teller Machine (ATM) at one of the entity's facilities, a second apparatus at a teller's station, another financial institution, or the like. In other embodiments, the apparatus may be specially configured to capture the image of the resource distribution instrument for storage and exception processing.

As illustrated in block 122, the system may perform initial processing of the resource distribution instrument. In this way, the system may receive the resource distribution instrument, confirm authenticity, and then lift indicia in the form of data off of the resource distribution instrument using optical character recognition (OCR). The OCR processes enables the system to convert text and other symbols in the resource distribution instrument images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Next, as illustrated in block 124, the process 150 continues by performing a bi-tonal conversion of the image. As such, if the image of the resource distribution instrument to a third party financial institution, the system may make the image bi-tonal for transfer to the third party financial institution. This is done to return checks to the account holder institution for account reconciliation.

After the successful retrieval or capture of the image of the resource distribution instrument and generating a bi-tonal image for third party transmission, the apparatus may process the resource distribution instrument as illustrated in block 126. The apparatus may capture individual pieces of resource distribution instrument information from the image of the resource distribution instrument as indicia and in metadata form. In some embodiments, the resource distribution instrument information may be text. In other embodiments, the resource distribution instrument information may be an image processed into a compatible data format.

As illustrated in block 128, the method comprises storing resource distribution instrument information. After the image of the resource distribution instrument is processed, the apparatus may store the lifted and collected resource distribution instrument information in a compatible data format. In some embodiments, the resource distribution instrument information may be stored as metadata. As such, individual elements of the resource distribution instrument information may be stored separately, and may be associated with each other via metadata. In some embodiments, the individual pieces of resource distribution instrument information may be stored together. In some embodiments, the apparatus may additionally store the original image of the resource distribution instrument immediately after the image of the resource distribution instrument is received.

Finally, as illustrated in block 130, the process 150 is finalized by identifying blank spaces based on the bi-tonal conversion. In this way, some resource distribution instruments, such as certified checks or the like are not able to be processed via current mobile deposit technology. Some ink, pre-printed documents, or the like do not image resource amounts properly based on ink contrast causing blank spaces where the amount typically would be. These may include money grams, certified checks, or the like that may not be imaged properly via mobile deposit technology. As such, the resource amount, upon binomial conversion disappear and become blank space to the network.

Referring now to FIG. 3, FIG. 3 presents provides a high level process flow illustrating identifying resource distribution document images for encoding 160, in accordance with some embodiments of the invention. As illustrated in block 132, the process 160 may identify resource distribution instrument images for encoding. In this way, the system may identify the resource distribution instrument images that have been converted to a bi-tonal image that include blank space that need to be encoded for identification of the information that was in the blank space originally. The blank space may be a location on the resource distribution instrument image that upon OCR the information that was in that blank space has faded or failed to be transferred to the image. For example, the original resource distribution instrument may have an amount of the distribution displayed. However, after bi-tonal image processing the location where the amount was in the original resource distribution instrument is now blank space. This may be due to a lack of contrast, certain ink, or the like that doesn't transfer via the image scanning process. The resource distribution instrument images that have blank space may need to be encoded for deposit correction.

The system may be able to identify the resource distribution instrument images that may require to be encoded. In some embodiments, the images required for encoding may be determined based on the bi-tonal conversion. In some embodiments, the images may be determined for coding based on historic or known images that require encoding.

As illustrated in block 136, the system may transfer known images for encoding. In this way, the resource distribution instrument images that the system knows need to be encoded may be automatically transmitted to the encoding process without associate interaction. In some embodiments, the system may identify the images required for encoding based on the bi-tonal conversion, as illustrated in block 134. In this way, upon bi-tonal conversion, the system or an associate may identify blank space and transmit the image into the encoding processing.

As illustrated in block 138, the process 160 continues by categorizing and queuing the resource distribution instrument images for encoding. In some embodiments, the encoding may be digital encoding or a virtual overlay of date elements. The data elements may be the data that was in the blank space. As such, the resource distribution instrument image with encoding may include all information from the original resource distribution instrument before the blank space was introduced. In some embodiments, the data elements may be encoded and embedded into the MICR line. This embedding may be visible internally at the entity for processing by will be removed and not visible by third parties.

Next, as illustrated in block 140, the process 160 continues by generating a data element encoding for the resource distribution instrument. The data element will include all data lost in the blank space of the bi-tonal resource distribution instrument image. As such, the encoding may include all of the information and elements associated with the original resource distribution instrument.

Finally, as illustrated in block 142, the process 160 is finalized by providing the data element encoding as a layer onto the MICR line of the resource distribution instrument image. The invention provides a digital encoding or virtual overlay of a data element on a resource distribution document. The system may identify the type of resource distribution instrument and queue it for encoding based on the type of resource distribution instrument. In this way, the encoding may be a layer for a user to view the data element to confirm the resource amount associated with the resource distribution instrument. The encoding may be embedded into the MICR line or generate a virtual overlay. This encoding will be placed on the resource distribution instrument image before transmitted to an external entity. The encoding will be virtually placed on the image as an overlay for internal processing and will not be visible on the actual check image when transmitted externally.

Referring now to FIG. 4, FIG. 4 provides a high level process flow illustrating identifying and extracting indicia and data from resource distribution documents 100, in accordance with some embodiments in the invention. One or more devices 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more resource distribution instrument images are received. The resource distribution instrument images comprise the front portion of a resource distribution instrument, the back portion of a resource distribution instrument, or any other portions of a resource distribution instrument. In cases where there are several resource distribution instruments piled into a stack, the multiple resource distribution instrument images may include, for example, at least a portion of each of the four sides of the resource distribution instrument stack. In this way, any text, numbers, or other data provided on any side of the resource distribution instrument stack may also be used in implementing the process 100. In some embodiments the system may receive financial documents, payment instruments, resource distribution instruments, or the likes.

In some embodiments, each of the resource distribution instrument images comprises indicia that includes financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, resource distribution instrument numbers, document identifiers, account numbers, merchant codes, file identifiers, source identifiers, and the like.

It will be understood that any type of financial record image may be received. Exemplary resource distribution instrument images include PDF files, scanned documents, digital photographs, and the like. At least a portion of each of the resource distribution instrument images, in some embodiments, is received from a financial institution, a merchant, a signatory of the financial record (e.g., the entity having authority to endorse or issue a financial record), and/or a party to a financial record. In other embodiments, the resource distribution instrument images are received from image owners, account holders, agents of account holders, family members of account holders, financial institution customers, payors, payees, third parties, and the like. In some embodiments, the source of at least one of the resource distribution instruments includes an authorized source such as an account holder or a third party financial institution. In other embodiments, the source of at least one of the resource distribution instruments includes an unauthorized source such as an entity that intentionally or unintentionally deposits or provides a resource distribution instrument image to the system of process 100.

In some exemplary embodiments, a customer or other entity takes a picture of a resource distribution instrument at a point of sales or an automated teller machine (ATM) and communicates the resulting resource distribution instrument image to a point of sales device or ATM via wireless technologies, near field communication (NFC), radio frequency identification (RFID), and other technologies. In other examples, the customer uploads or otherwise sends the resource distribution instrument image to the system of process 100 via email, short messaging service (SMS) text, a web portal, online account, mobile applications, and the like. For example, the customer may upload a resource distribution instrument image to deposit funds into an account or pay a bill via a mobile banking application using a capture device. The capture device can include any type or number of devices for capturing images or converting a resource distribution instrument to any type of electronic format such as a camera, personal computer, laptop, notebook, scanner, mobile device, and/or other device.

As illustrated at block 104, optical character recognition (OCR) processes are applied to at least a portion of the resource distribution instrument images. At least one OCR process may be applied to each of the resource distribution instrument images or some of the resource distribution instrument images. The OCR processes enables the system to convert text and other symbols in the resource distribution instrument images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

The resource distribution instrument indicia and corresponding data may be identified based on the applied OCR processing. In some embodiments, the OCR process includes location fields for determining the position of data on the resource distribution instrument image. Based on the position of the data, the system can identify the type of data in the location fields to aid in character recognition. For example, an OCR engine may determine that text identified in the upper right portion of a resource distribution instrument image corresponds to a resource distribution instrument number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the resource distribution instrument into quadrants. As referred to herein, the term quadrant is used broadly to describe the process of differentiating elements of a resource distribution instrument image by separating portions and/or elements of the image of the resource distribution instrument into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the resource distribution instrument using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the resource distribution instrument, used for identifying the resource distribution instrument, and the like. Once the system determines the quadrants of the image of the resource distribution instrument having valuable and/or useful information, the system can extract the identified quadrants together with the information from the image of the resource distribution instrument for storage. The quadrants may be extracted as metadata, text, or code representing the contents of the quadrant. In some embodiments, the quadrants of the image of the resource distribution instrument that are not identified as having valuable and/or useful information are not extracted from the image.

In alternative or additional embodiments, the OCR process includes predefined fields to identify data. The predefined field includes one or more characters, words, or phrases that indicate a type of data. In such embodiments, the system of process 100 extracts all the data presented in the resource distribution instrument image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the resource distribution instrument images. In other embodiments, the system uses the magnetic ink character recognition (MICR) to determine the position of non-data (e.g., blank space) and data elements on a resource distribution instrument image. For example, the MICR of a resource distribution instrument may indicate to the system that the received or captured resource distribution instrument image is a business resource distribution instrument with certain dimensions and also, detailing the location of data elements, such as the resource distribution instrument amount box or payee line. In such an instance, once the positions of this information is made available to the system, the system will know to capture any data elements to the right or to the left of the identified locations or include the identified data element in the capture. This system may choose to capture the data elements of a resource distribution instrument in any manner using the information determined from the MICR number of the resource distribution instrument.

As illustrated in block 106, the system may generate a bi-tonal image of the resource distribution instrument. In this way, the system may create a grayscale image of the resource distribution instrument. Upon generation of the bi-tonal image, the system may identify one or more images that contain a blank out or area of unrecognition of the data within an area. If no blank space is identified in block 106, the process 100 continues to process the resource distribution instrument to third party institutions with no encoding. In this way, the third party financial institution may reconcile the accounts and resource distribution instruments stemming from those accounts.

As illustrated in block 108, the system may identify a blank space and detect an unrecognized or blank spaced image that requires encoding. Exemplary unrecognized data includes handwritten text, blurred text, faded text, misaligned text, misspelled data, any data not recognized by the OCR processes or other data recognition techniques, and the like. In other cases, at least a portion of some or all of the resource distribution instrument images may undergo pre-processing to enhance or correct the unrecognized data. For example, if the text of a resource distribution instrument image is misaligned or blurry, the system may correct that portion of the resource distribution instrument image before applying the OCR processes to increase the probability of successful text recognition in the OCR processes or other image processes.

Once detected, the system may allow for the encoding of the resource distribution instrument with a data element that includes the information missing from the blank space, as illustrated in block 110. The invention provides a digital encoding or virtual overlay of a data element on a resource distribution document. The system may identify the type of resource distribution instrument and queue it for encoding based on the type of resource distribution instrument. In this way, the encoding may be a layer for a user to view the data element to confirm the resource amount associated with the resource distribution instrument. The encoding may be embedded into the MICR line or generate a virtual overlay. This encoding will be placed on the resource distribution instrument image before transmitted to an external entity. The encoding will be virtually placed on the image as an overlay for internal processing and will not be visible on the actual check image when transmitted externally.

As illustrated at block 111, the process 100 continues by determining, based on the confidence level of the encoding, if a secondary check of the unrecognized data is necessary to confirm accuracy of the encoding. As such, based on a confidence level, the system may require additional check to confirm the accuracy of the identification of the blank space data and encoding of the data.

The system then allows for the resource distribution instruments to be processed as normal resource distribution instruments with the encoded MICR line providing the information from the blank space onto the instrument for continued processing. Once the internal processing of the resource distribution instruments is completed, as illustrated in block 112, the system may process the images to third party institutions with the encoding removed.

FIG. 5A provides an illustration of an exemplary image of a financial record 300, in accordance with one embodiment of the present invention. The financial record illustrated in FIG. 5A is a resource distribution instrument. However, one will appreciate that any financial record, financial document, payment instrument, or the like may be provided.

The image of resource distribution instrument 300 may comprise an image of the entire resource distribution instrument, a thumbnail version of the image of the resource distribution instrument, individual pieces of resource distribution instrument information, all or some portion of the front of the resource distribution instrument, all or some portion of the back of the resource distribution instrument, or the like. Resource distribution instrument 300 comprises resource distribution instrument information, wherein the resource distribution instrument information comprises contact information 305, the payee 310, the memo description 315, the account number and routing number 320 associated with the appropriate user or customer account, the date 325, the resource distribution instrument number 330, the amount of the resource distribution instrument 335, the signature 340, or the like. In some embodiments, the resource distribution instrument information may comprise text. In other embodiments, the resource distribution instrument information may comprise an image. A capture device may capture an image of the resource distribution instrument 300 and transmit the image to a system of a financial institution via a network. The system may collect the resource distribution instrument information from the image of the resource distribution instrument 300 and store the resource distribution instrument information in a datastore as metadata. In some embodiments, the pieces of resource distribution instrument information may be stored in the datastore individually. In other embodiments, multiple pieces of resource distribution instrument information may be stored in the datastore together.

FIG. 5B provides an illustration of an exemplary image of a financial record that has been encoded 300, in accordance with one embodiment of the present invention. The financial record illustrated in FIG. 5B is a resource distribution instrument. However, one will appreciate that any financial record, financial document, payment instrument, or the like may be provided.

The image of resource distribution instrument 300 may comprise an image of the entire resource distribution instrument, a thumbnail version of the image of the resource distribution instrument, individual pieces of resource distribution instrument information, all or some portion of the front of the resource distribution instrument, all or some portion of the back of the resource distribution instrument, or the like. Resource distribution instrument 300 comprises resource distribution instrument information, wherein the resource distribution instrument information comprises contact information 305, the payee 310, the memo description 315, the account number and routing number 320 associated with the appropriate user or customer account, the date 325, the resource distribution instrument number 330, the amount of the resource distribution instrument 335, the signature 340, or the like. In some embodiments, the resource distribution instrument information may comprise text.

Furthermore, as illustrated, the encoding 350 is illustrated and provides an indication to the data of the blank space. In this way, the encoding may be a layer for a user to view the data element to confirm the resource amount associated with the resource distribution instrument. The encoding may be embedded into the MICR line, as illustrated in the encoding 305 or generate a virtual overlay. This encoding will be placed on the resource distribution instrument image before transmitted to an external entity. The encoding will be virtually placed on the image as an overlay for internal processing and will not be visible on the actual check image when transmitted externally.

FIG. 6A illustrates an exemplary template of a financial record 400, in accordance with one embodiment of the present invention. Again, the financial record illustrated in FIG. 5 is a resource distribution instrument. However, one will appreciate that any financial record, financial document, payment instruments, or the like may be provided.

In the illustrated embodiment, the resource distribution instrument template 400 corresponds to the entire front portion of a resource distribution instrument, but it will be understood that the resource distribution instrument template 400 may also correspond to individual pieces of resource distribution instrument information, portions of a resource distribution instrument, or the like. The resource distribution instrument template, in some embodiments, includes the format of certain types of resource distribution instruments associated with a bank, a merchant, an account holder, types of resource distribution instruments, style of resource distribution instruments, resource distribution instrument manufacturer, and so forth. By using the resource distribution instrument template, the system may "learn" to map the key attributes of the resource distribution instrument for faster and more accurate processing. In some embodiments, financial records are categorized by template. The resource distribution instrument template 400 is only an exemplary template for a financial record, and other resource distribution instrument templates or other financial record templates may be utilized to categorize resource distribution instruments or other financial records. The resource distribution instrument template 400 can be used in the OCR processes, image overlay techniques, and the like.

The resource distribution instrument template 400 comprises resource distribution instrument information, wherein the resource distribution instrument information includes, for example, a contact information field 405, a payee line field 410, a memo description field 415, an account number and routing number field 420 associated with the appropriate user or customer account, a date line field 425, a resource distribution instrument number field 430, an amount box field 435, a signature line field 440, or the like.

FIG. 6B illustrates an exemplary template of a financial record 400, in accordance with one embodiment of the present invention. Again, the financial record illustrated in FIG. 6B is a resource distribution instrument. However, one will appreciate that any financial record, financial document, payment instruments, or the like may be provided.

The resource distribution instrument template 400 comprises resource distribution instrument information, wherein the resource distribution instrument information includes, for example, a contact information field 405, a payee line field 410, a memo description field 415, an account number and routing number field 420 associated with the appropriate user or customer account, a date line field 425, a resource distribution instrument number field 430, an amount box field 435, a signature line field 440, or the like.

Furthermore, as illustrated, the encoding 450 is illustrated and provides an indication to the data of the blank space. In this way, the encoding may be a layer for a user to view the data element to confirm the resource amount associated with the resource distribution instrument. The encoding may be embedded into the MICR line, as illustrated in the encoding 305 or generate a virtual overlay. This encoding will be placed on the resource distribution instrument image before transmitted to an external entity. The encoding will be virtually placed on the image as an overlay for internal processing and will not be visible on the actual check image when transmitted externally.

The invention provides a digital encoding or virtual overlay of a data element on a resource distribution document. The system may identify the type of resource distribution instrument and queue it for encoding based on the type of resource distribution instrument. In this way, the encoding may be a layer for a user to view the data element to confirm the resource amount associated with the resource distribution instrument. The encoding may be embedded into the MICR line or generate a virtual overlay. This encoding will be placed on the resource distribution instrument image before transmitted to an external entity. The encoding will be virtually placed on the image as an overlay for internal processing and will not be visible on the actual check image when transmitted externally.

FIG. 7 provides a process flow illustrating resource distribution instrument encoding logic location identification 600, in accordance with one embodiment of the present invention. As illustrated in block 602, the process 600 may include the various locations of the resource distribution instrument encoding logic locations.

The resource distribution instruments may be received in various forms, such as in an image format. Processing of the document may proceed wherein the indicia from the document may be collected and lifted from the document. This data is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques.

In some embodiments, there may be blank space or the like based on OCR and/or bi-tonal scanning of the resource distribution instrument. The blank space may be identified and/or located along several locations along the process. This may include the internal front side capture by utilizing reception at the front side location, as illustrated in block 604. Also, as illustrated in block 606, the capture may be generated via the RECO process by RECO engine or artificial intelligence at the channel service level. Next, as illustrated in block 608, when the resource distribution instrument is being reviewed by a keyer reviewer.

As illustrated, the resource distribution instrument images may now include an encoding based on one or more of the points within the resource distribution instrument encoding logic location inputs. Once internal processing has been completed, the system may remove the encoding and provide the resource documents to external financial institutions, as illustrated in block 610.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time image capture correction, the system comprising:
    a memory device with computer-readable program code stored thereon;
    a communication device;
    a processing device operatively coupled to the memory device and the communication device, wherein the processing device is configured to execute the computer-readable program code to:
    receive an electronic image associated with a resource distribution instrument;
    perform bi-tonal transformation to generate a resource distribution instrument image for internal processing and external processing of the resource distribution instrument;
    identify unresolved indicia associated with the generated resource distribution instrument image, wherein the unresolved indicia includes a missing or faded data element;
    queue the resource distribution instrument image for encoding based on identification of unresolved indicia including blank space;
    encode the resource distribution instrument image via overlay with an encoded version of the missing or faded data element;
    continue the internal processing of the resource distribution instrument using the resource distribution instrument image, wherein continuing the internal processing allows internal users access to the encoded version of the missing or faded data element for identification of the blank space; and
    remove the encoded version of the missing or faded data element from the resource distribution instrument image upon external transmission.

2. The system of claim 1, wherein identifying the unresolved indicia associated with the generated resource distribution instrument image further comprises processing the resource distribution instrument image via an artificial intelligence processor to identify if the resource distribution instrument image matches a historic resource distribution instrument type that has blank space with a missing or faded data element.

3. The system of claim 1, wherein the identifying unresolved indicia associated with the generated resource distribution instrument image further comprises manual identification of blank space within the resource distribution instrument image that includes a missing of faded data element.

4. The system of claim 1, wherein the unresolved indicia associated with the generated resource distribution image further comprises the blank space created by the bi-tonal transformation comprising one or more missing or faded data elements at the location of the created the blank space.

5. The system of claim 1, wherein the unresolved indicia is unidentifiable data of a value of resources associated with the resource distribution instrument.

6. The system of claim 1, wherein the receiving the electronic image associated with the resource distribution element further comprises receiving data representing one or more resolved indicia that has been discerned with a selected level of confidence from the electronic image, wherein the one or more resolved indicia is at least one of: data related to a payor, data related to a payor account, or data related to a payee and an indicator indicating the unresolved indicia including the blank spaces in the electronic image associated with the electronic image that has not been resolved to a level of confidence.

7. The system of claim 1, wherein the encoding the resource distribution instrument image via overlay with the encoded version of the missing or faded data element further comprises digitally or virtually encoding on a Magnetic Ink Character Recognition (MICR) line of the resource distribution instrument image an amount of resource distribution associated with the resource distribution instrument, wherein a location of the amount on the resource distribution instrument image is blank space due to bi-tonal processing.

8. A computer program product for real-time image capture correction, the computer program product comprising at least one non-transitory computer-readable medium having computer-readable program code portions embodied therein, the computer-readable program code portions comprising:
an executable portion configured for receiving an electronic image associated with a resource distribution instrument;
an executable portion configured for performing bi-tonal transformation to generate a resource distribution instrument image for internal processing and external processing of the resource distribution instrument;
an executable portion configured for identifying unresolved indicia associated with the generated resource distribution instrument image, wherein the unresolved indicia includes a missing or faded data element;
an executable portion configured for queuing the resource distribution instrument image for encoding based on identification of unresolved indicia including blank space;
an executable portion configured for encoding the resource distribution instrument image via overlay with an encoded version of the missing or faded data element;
an executable portion configured for continuing the internal processing of the resource distribution instrument using the resource distribution instrument image, wherein continuing the internal processing allows internal users access to the encoded version of the missing or faded data element for identification of the blank space; and
an executable portion configured for removing the encoded version of the missing or faded data element from the resource distribution instrument image upon external transmission.

9. The computer program product of claim 8, wherein the identifying unresolved indicia associated with the generated resource distribution instrument image further comprises processing the resource distribution instrument image via an artificial intelligence processor to identify if the resource distribution instrument image matches a historic resource distribution instrument type that has blank space with a missing or faded data element.

10. The computer program product of claim 8, wherein the identifying unresolved indicia associated with the generated resource distribution instrument image further comprises manual identification of blank space within the resource distribution instrument image that includes a missing of faded data element.

11. The computer program product of claim 8, wherein the unresolved indicia associated with the generated resource distribution image further comprises blank space created by the bi-tonal transformation comprising one or more missing or faded data elements at the location of the created blank space.

12. The computer program product of claim 8, wherein the unresolved indicia is unidentifiable data of a value of resources associated with the resource distribution instrument.

13. The computer program product of claim 8, wherein the receiving the electronic image associated with the resource distribution element further comprises receiving data representing one or more resolved indicia that has been discerned with a selected level of confidence from the electronic image, wherein the one or more resolved indicia is at least one of: data related to a payor, data related to a payor account, or data related to a payee and an indicator indicating the unresolved indicia including the blank spaces in the electronic image associated with the electronic image that has not been resolved to a level of confidence.

14. The computer program product of claim 8, wherein the encoding the resource distribution instrument image via overlay with the encoded version of the missing or faded data element further comprises digitally or virtually encoding on a Magnetic Ink Character Recognition (MICR) line of the resource distribution instrument image an amount of resource distribution associated with the resource distribution instrument, wherein a location of the amount on the resource distribution instrument image is blank space due to bi-tonal processing.

15. A computer-implemented method for real-time image capture correction, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving an electronic image associated with a resource distribution instrument;
performing bi-tonal transformation to generate a resource distribution instrument image for internal processing and external processing of the resource distribution instrument;

identifying unresolved indicia associated with the generated resource distribution instrument image, wherein the unresolved indicia includes a missing or faded data element;

queuing the resource distribution instrument image for encoding based on identification of unresolved indicia including blank space;

encoding the resource distribution instrument image via overlay with an encoded version of the missing or faded data element;

continuing the internal processing of the resource distribution instrument using the resource distribution instrument image, wherein continuing the internal processing allows internal users access to the encoded version of the missing or faded data element for identification of the blank space; and removing the encoded version of the missing or faded data element from the resource distribution instrument image upon external transmission.

16. The computer-implemented method of claim 15, wherein the identifying unresolved indicia associated with the generated resource distribution instrument image further comprises processing the resource distribution instrument image via an artificial intelligence processor to identify if the resource distribution instrument image matches a historic resource distribution instrument type that has blank space with a missing or faded data element.

17. The computer-implemented method of claim 15, wherein the identifying unresolved indicia associated with the generated resource distribution instrument image further comprises manual identification of blank space within the resource distribution instrument image that includes a missing of faded data element.

18. The computer-implemented method of claim 15, wherein the unresolved indicia associated with the generated resource distribution image further comprises blank space created by the bi-tonal transformation comprising one or more missing or faded data elements at the location of the created blank space.

19. The computer-implemented method of claim 15, wherein the unresolved indicia is unidentifiable data of a value of resources associated with the resource distribution instrument.

20. The computer-implemented method of claim 15, wherein the encoding the resource distribution instrument image via overlay with the encoded version of the missing or faded data element further comprises digitally or virtually encoding on a Magnetic Ink Character Recognition (MICR) line of the resource distribution instrument image an amount of resource distribution associated with the resource distribution instrument, wherein a location of the amount on the resource distribution instrument image is blank space due to bi-tonal processing.

* * * * *